April 28, 1931.                J. KLEFFMAN                1,802,918
                                  SNARE
                            Filed Feb. 24, 1928
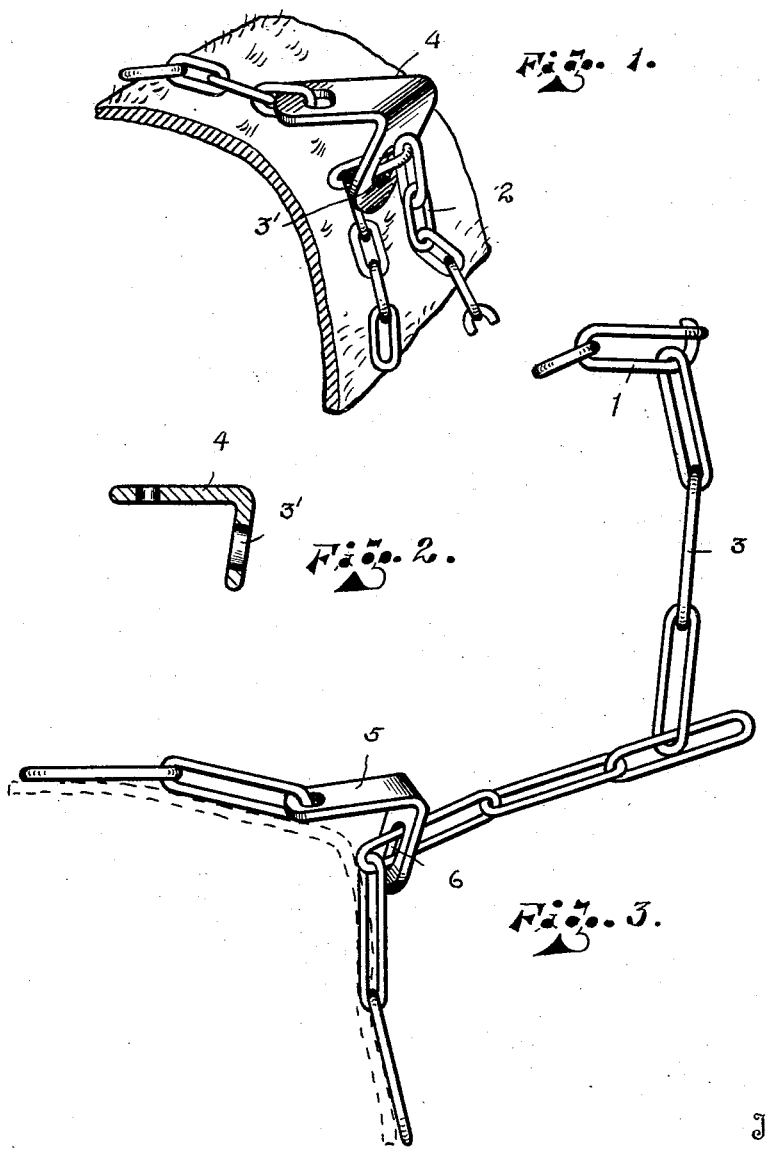
Inventor
John Kleffman.
By
Geo Stevens
    Attorney Patented Apr. 28, 1931

1,802,918

UNITED STATES PATENT OFFICE

JOHN KLEFFMAN, OF HIBBING, MINNESOTA

SNARE

Application filed February 24, 1928. Serial No. 256,537.

This invention relates to snares and has special reference to a "live" and "dead" snare, that is to say, one capable of being set for taking animals either alive or dead as preferred, and which forms the principal object of the invention.

Another object is to provide such a snare or trap which when set for taking an animal either dead or alive will do so in the most humane manner possible, that is, when killing an animal it will do so as quickly as possible, and when taking the creature alive it will hold same firmly with the least abuse possible in the way of abnormally choking or hurting it.

Other objects and advantages of the invention will appear in the further description thereof.

Referring now to the accompanying drawing, forming part of this application, and wherein like reference characters indicate like parts:

Figure 1 is a perspective view of a fragmental portion of the killing end of the snare;

Figure 2 is a sectional view of the preferred form of catch for the snare; and

Figure 3 is a view similar to Figure 1, but of the "live" end of the snare.

In order to accomplish the objects sought the snare or trap is composed of two substantially equal lengths of chain, made of the desired strength for the particular kind of animal to be caught, and united for example as by the cold shut link or clevis 1, though as is obvious they may be attached in any desired manner. One end of the chain thus united is made of links 2 which are very much shorter than the links 3 of which the other end of the chain is composed. These short links are so designed as to pass freely through the hole 3' in the catch 4 attached to the extreme end of the short link or killing section of the snare, so that any considerable stress applied by an animal caught therein, for example about the neck, will tend to pay the short links readily therethrough; but these links are made sufficiently long to become bound within the hole when slack occurs in the stress and hold firmly, thus quickly choking the animal to death.

To augment this binding of the links in the catch, I have made same of acute angular form, so that the direction of stress of the chain through the hole 3 will be more nearly at right angles to the axis of the hole, as clearly seen in Figure 1.

A similarly shaped catch 5 is applied to the opposite end of the snare or trap chain and the body of same is payed through the hole 6 in the catch, which corresponds to the hole 3' in the catch at the opposite end; and the same angle of catch is here desirable in that the direction of stress upon the next to the last link is more nearly at right angles to the axis of the hole 6 than if the angle of the catch were less acute, thereby insuring against said next to the last link passing through the hole providing it is bearing against the neck or body of the animal being caught. Due to the abnormal length of these links it becomes impossible to pull the snare about the animal's neck or body sufficiently tight to materially injure same, as clearly illustrated, in Figure 3 of the drawings.

It is evident that when either end of the chain is being used as a snare the other end may conveniently be used as attaching means to any suitable form of anchorage by of course reducing the loop on the opposite end to small dimension and slipping the body of the chain through same after passing it around the post, tree, or whatever the anchorage may be.

From the foregoing it is evident that I have devised an exceedingly simple and humane trap or snare, which may be used just as desired after determining on the spot when the evidence of the kind of animal is seen, and it is obvious that various modifications of the specific structure, such as making the catch of round iron, may be resorted to without departing from the spirit of the invention.

Having thus described my invention, what I claim and desire to secure by Letters Patent, is:

A double purpose snare characterized by having short links and catch therefor at one end and longer links and catch therefor at the opposite end for the purpose described.

In testimony whereof I affix my signature.

JOHN KLEFFMAN.